United States Patent Office 3,180,846
Patented Apr. 27, 1965

3,180,846
ISOCYANURATE POLYMERS PREPARED IN A SOL-
VENT WHICH CONTAINS LESS THAN .03% BY
WEIGHT OF WATER
Geoffrey Arthur Haggis, Manchester, England, assignor to
Imperial Chemical Industries Limited, London, Eng-
land, a corporation of Great Britain
No Drawing. Filed Nov. 19, 1962, Ser. No. 238,791
Claims priority, application Great Britain, Nov. 27, 1961,
42,292/61
11 Claims. (Cl. 260—31.2)

This invention relates to improvements in the manufacture of polymers in particular in the manufacture of polymers of organic polyisocyanates.

It is known to polymerise organic isocyanates with a variety of basis catalysts to give polymers possessing the isocyanurate ring structure and in the case of polyisocyanates, isocyanurate polymers having free isocyanate groups. It is often convenient to carry out such polymerisation reactions in a solvent, for example an ester solvent such as ethyl acetate. Isocyanate reactions are normally carried out in substantially dry solvents; solvents so described normally containing water in the proportion of 0.1% to 0.2% by weight.

We have now found that if an organic polyisocyanate is polymerised with a basic catalyst in a solvent the proportion of water present in the solvent, even when the water is present in very low concentration, has a surprisingly important effect on the rate of polymerisation and on the nature of the product obtained. We have found that if the water content of the isocyanate/solvent mixture does not exceed 0.03% by weight the polymerisation rate is much improved and that polymerisation products of lower viscosity for a given degree of polymerisation are obtained.

Thus according to the present invention there is provided a process for the manufacture of isocyanate group-containing isocyanurate compounds comprising polymerising an organic isocyanate in a solvent in the presence of a basic polymerisation catalyst, said polymerisation mixture containing at most 0.03% by weight of water of the total weight of the polymerisation mixture.

It has been found that the use of solvents containing exceedingly small amounts of water is particularly advantageous and it is preferred that the polymerisation mixture should contain not more than 0.01% by weight of water.

Solvents suitable for use in the improved process of the present invention include for example esters such as ethyl acetate, butyl acetate, amyl acetate, ethoxyethyl acetate, diethyl phthalate, dimethyl phthalate and butyl benzoate, methyl isobutyl ketone, chloroform, benzene, toluene, xylene, butyrolactone, monochlorobenzene, o-dichlorobenzene, ethers and petroleum ethers or mixtures of such solvents.

Solvents which have been found to be particularly useful in the improved process of the present invention are ester solvents such as ethyl acetate and butyl acetate.

Solvents containing exceedingly small amounts of water are obtained for example by precision distillation under anhydrous conditions, treatment with dehydrating agents such as magnesium sulphate or quicklime or by treatment with molecular sieves.

Any organic polyisocyanate or mixture of polyisocyanates may be polymerised according to the present process. Examples of such polyisocyanates include p-phenylene diisocyanate, 1-methoxyphenylene-2:4-dissocyanate, 3:3' - dimethyl - 4:4' - diisocyanatodiphenylmethane, diphenylene-4:4'-diisocyanate, 4:4' - diisocyanatodiphenyl ether, naphthylene-1:5-diisocyanate, tolylene-2:4-diisocyanate, tolylene-2:6-diisocyanate, m-phenylene diisocyanate, chlorophenylene-2:4-diisocyanate, m-xylylene diisocyanate, diisocyanatodiphenylmethane, hexamethylene diisocyanate, diisocyanatodicyclohexlmethane, p-xylylene diisocyanate, isocyanatobenzyl isocyanates, 1:2:3:4:5:6-hexahydrodiphenylene-4:4'-diisocyanate, 4:4'-diisocyanto-1:2:3:4:5:6-hexahydrodiphenylmethane, 1:2:3:4 - tetrahydronaphthalene-1:5-diisocyanate, toluene - 2:4:6-triisocyanate, 3-methyl-4:6:4' - triisocyanatodiphenylmethane, 2:4:4'-triisocyanatodiphenyl, 2:4:4'-triisocyanatodiphenyl ether and liquid polyisocyanate compositions obtained by phosgenating the polyamines obtained by condensing formaldehyde with a mixture of at least two aromatic amines as described in U.K. patent specification 842,154. Polyisocyanates may be polymerised in admixture with monoisocyanates such as phenyl isocyanate, tolyl isocyanates, chlorphenyl isocyanates or methoxyphenyl isocyanates. Isocyanate-ended reaction products of organic polyiscyanates such as those listed above, with organic hydroxy compounds such as for example monohydric alcohols, glycols, trihydric alcohols and phenols may also be used wholly or in part.

Organic polyisocyanates that may especially advantageously be polymerised according to the process of the present invention are tolylene-2:4 and 2:6-diisocyanates and mixtures thereof.

It is necessary that the isocyanate should be substantially free from reaction products of water with the isocyanate group, for example substituted ureas or biurets, that is free to a degree such that the total proportion of water present as such or in the form of water/isocyanate reaction products does not exceed 0.03%.

Basic polymerisation catalysts suitable for use in the process of the present invention include those catalysts known to give isocyanate polymers containing the isocyanurate ring structure.

Examples of such catalysts include aliphatic tertiary amines, alkali or alkaline earth metal oxides, hydroxides, carbonates, alcoholates or phenates, alkali metal salts of enolisable compounds and metallic salts of weak organic carboxylic acids.

Catalysts which have been found to be particularly advantageous in the improved process of the present invention are basic metallic compounds which are soluble in the reaction medium. Particularly preferred catalysts are calcium naphthenate and lead naphthenate.

It is preferred to use co-catalysts in conjunction with the basic catalysts referred to above; co-catalysts which have proved particularly useful are mono-N-substituted carbamic esters.

Examples of mono-N-substituted carbamic esters for use in the process of the present invention include the esters of phenyl carbamic acid and substitution products thereof, tolylene-2:4-bis-carbamic acid, tolylene-2:6-bis-carbamic acid, 1:3 and 1:4-phenylene-bis-carbamic acids, hexamethylene-1:6-bis-carbamic acid and chlorophenylene-2:4-bis-carbamic acid with alcohols and phenols. It is preferred to use esters of phenols.

It is particularly preferred to make use of a mono-N-substituted carbamic ester formed in situ by the addition of an alcohol or a phenol to the isocyanate or mixture of isocyanates to be polymerized. Examples of alcohols or phenols that may be added include methanol, ethanol, propanol, isopropanol and higher aliphatic alcohols, cyclohexanol, benzyl alcohol and substitution products thereof, phenol, cresols, xylenols and substitution products thereof, and polyhydric alcohols and phenols such as ethylene glycol, 1:4-butylene glycol, diethylene glycol, glycerol and catechol.

Such co-catalysts may be employed during the whole period of the polymerization or may be used solely in the later stages.

Mono-N-substituted carbamic esters can conveniently be introduced into the reaction mixture by addition of the desired quantity of an alcohol or phenol to the polyisocyanate solution before or during polymerisation.

The proportion of catalyst required depends on the activity of the catalyst and the nature of the polyisocyanate. Amounts within the range 0.01% to 10.0% by weight of the polyisocyanate are generally found useful.

The proportion of co-catalyst used is normally from 0.01% to 5% by weight and preferably from 0.1% to 0.5% by weight of the polyisocyanate.

It is essential that the catalyst and co-catalyst where used should be substantially free from water or that they do not raise the amount of water in the polymerisation mixture above the desired level.

The temperature employed for the polymerisation may vary over wide limits and the temperature employed is usually in the range from 10° C. to 100° C. and depends to some extent on the solvent used. If too high a temperature is used considerable side reactions and discolouration may occur.

The concentration of the polyisocyanate in the solvent may vary considerably but it is preferred to use a mixture containing from 20% to 60% by weight of polyisocyanate based on the combined weight of polyisocyanate and solvent.

When the desired solution of polymer has been obtained further polymerisation may be prevented, for example by mechanical removal of an insoluble catalyst by filtration or by the inactivation of soluble catalysts by treatment with the calculated amount, or a slight excess thereof, of a strong acid such as anhydrous hydrogen chloride or phosphoric acid.

The improved process of the present invention leads to more rapid polymerisation of organic polyisocyanates and to products of lower viscosity. Thus with proportions of water in the polymerisation mixture greater than 0.03% by weight the polymerisation rate becomes too slow to be of practical use and the products produced are of a higher viscosity for a given degree of polymerisation. The present improved process using a polymerisation mixture containing less than 0.03% by weight of water is of particular value in rapidly producing solutions of isocyanurate polymers of relatively low viscosity but of a sufficiently high degree of polymerisation to ensure that a negligible proportion of unchanged monomer is present, for example <0.5% by weight on a 40% solution of polymer.

Isocyanurate polymers of organic polyisocyanates prepared by the present improved process are useful in the manufacture of polyurethanes by methods described in the prior art, such polyurethanes may be homogeneous or cellular, rigid or elastomeric. They are particularly useful in the manufacture of surface coatings in that the solutions obtained are of relatively low viscosity and therefore are easily applied in conjunction with for example hydroxyl group-containing polyesters or polyethers either by brush or spray application and also possess high curing activity. The low viscosity in particular gives advantages in metering, for example in a two-feed spray gun.

The invention is illustrated but not limited by the following examples in which all parts and percentages are by weight.

*Example 1*

Tolylene diisocyanate (300 parts) containing 77% 2:4 isomer and 23% 2:6 isomer was dissolved in butyl acetate (450 parts) which contained 0.017% water, phenol (0.5 part) was added and the mixture heated to 55° C. 2.1 parts of a solution of calcium naphthenate in white spirit containing 4% calcium were added and the solution was maintained at 55° C. for 21½ hours; the catalyst was then neutralised by addition of 0.141 part of phosphoric acid, as a 4% solution in butyl acetate. The resulting solution contained 5.79% isocyanate groups and had a free tolylene diisocyanate content of 0.33%. The above procedure was repeated using butyl acetate containing 0.05% water. After 22 hours the solution contained 9.03% NCO groups and was neutralised after 45 hours to give a product containing 5.87% isocyanate groups and 0.75% free tolylene diisocyanate.

The first described procedure was again repeated using a sample of the same butyl acetate, but adding 0.08% of water to the solvent prior to adding the isocyanate, thus giving a water content of 0.097%. The polymerisation was terminated after 23¾ hours when the solution contained 11.1% isocyanate.

*Example 2*

Tolylene diisocyanate (66.7 parts) containing 77% 2:4 isomer and 23% 2:6-isomer was dissolved in ethyl acetate (100 parts) containing 0.02% water and less than 0.05% ethanol, phenol (0.11 part) was added and the mixture heated to 55° C. 0.4 part of a solution of calcium naphthenate in white spirit, containing 4% calcium, was added and the mixture was maintained at 55° C. for 10½ hours; the catalyst was then neutralised by addition of 0.027 part of phosphoric acid as a 4% solution in ethyl acetate. The resulting solution contained 7.3% isocyanate groups.

This procedure was repeated using a sample of the same ethyl acetate to which water had been added to give a water content of 0.1%. After 10½ hours the polymerisation was terminated, and the solution then contained 17.9% isocyanate groups, showing that only very slight polymerisation had occurred. (Initial isocyanate value= 19.2%.)

*Example 3*

50 parts of 2:4-tolylene diisocyanate are dissolved in 50 parts of methyl isobutyl ketone which contains 0.01% water, then 0.09 part of phenol is added. The solution is heated to 55° C. with exclusion of moisture and under a dry nitrogen atmosphere 0.38 part of a solution of calcium naphthenate in white spirit containing 4% calcium added, then heating continued at 55±1° C. After 22 hours the isocyanate group content has fallen from an initial 23.8% to 15.8%.

The experiment is repeated using the same methyl isobutyl ketone to which 0.05 part of water is added to give a water content of 0.1%. After 22 hours at 55±° C. the isocyanate group content is 22.9% indicating that only a slight amount of polymerisation has occurred.

*Example 4*

50 parts of 2:4-tolylene diisocyanate are dissolved in 75 parts of butyl acetate which contains 0.03% water. 0.083 part of phenol is added and the solution heated to 55° C. with exclusion of moisture and under a dry nitrogen atmosphere, after which 0.31 part of a solution of lead naphthenate in white spirit containing 24% lead is introduced. Heating is continued at 55±° C. and isocyanate group content measured at hourly intervals, this falls from an initial 19.1% to 8.5% in the course of 3 hours.

The experiment is repeated using the same butyl acetate to which 0.061 part of water is added to raise the water content to 0.11%. A reaction time at 55±° C. of 6 hours is now necessary to reach the same isocyanate group content of 8.5%, showing a considerably slower rate of polymerisation.

*Example 5*

50 parts of 2:4-tolylene diisocyanate are dissolved in 25 parts of anhydrous toluene and 50 parts ethyl acetate which contained 0.02% water, the water content of this solvent mixture being therefore 0.013%. After addition of 0.2 part of anhydrous methanol the temperature is raised to 60° C. with exclusion of moisture and under a dry nitrogen atmosphere. 0.37 part of solution of lead naphthenate in white spirit containing 24% lead is added and heating continued at 60±1° C. After 3½ hours the isocyanate group content has fallen from an initial 19.0% to 9.0%.

Repetition of this experiment with addition of 0.065 part of water to the same solvent mixture of toluene and ethyl acetate to give a water content of 0.1% results in the same isocyanate group content of 9.0% being reached in 6 hours, showing a considerably slower rate of polymerisation.

What we claim is:

1. A process for the manufacture of isocyanate group-containing isocyanurate compounds comprising polymerising an organic polyisocyanate in a solvent containing a basic polymerisation catalyst, said polymerisation mixture containing at most 0.03% by weight of water of the total weight of the polymerisation mixture.

2. A process for the manufacture of isocyanate group-containing isocyanurate compounds as claimed in claim 1 wherein the polymerisation mixture contains at most 0.01% by weight of water of the total weight of the polymerisation mixture.

3. A process for the manufacture of isocyanate group-containing isocyanurate compounds as claimed in claim 1 wherein the solvent is an ester selected from the group consisting of ethyl acetate, butyl acetate, amyl acetate, ethoxyethyl acetate, diethyl phthalate, dimethyl phthalate and butyl benzoate.

4. A process for the manufacture of isocyanate group-containing isocyanurate compounds as claimed in claim 3 wherein the ester is ethyl acetate.

5. A process for the manufacture of isocyanate group-containing isocyanurate compounds as claimed in claim 1 wherein the organic polyisocyanate is selected from the group consisting of tolylene-2:4-diisocyanate, tolylene-2:6-diisocyanate and mixtures thereof.

6. A process for the manufacture of isocyanate group-containing isocyanurate compounds as claimed in claim 1 wherein the basic polymerisation catalyst is basic metallic compound soluble in the polymerisation mixture.

7. A process for the manufacture of isocyanate group-containing isocyanurate compounds as claimed in claim 6 wherein the basic metallic compound is selected from a group consisting of calcium naphthenate and lead naphthenate.

8. A process for the manufacture of isocyanate group-containing isocyanurate compounds as claimed in claim 6 wherein there is added to the polymerisation mixture as co-catalyst a mono-N-substituted carbamic ester.

9. A process for the manufacture of isocyanate group-containing isocyanurate compounds as claimed in claim 1 wherein the basic polymerisation catalyst is used in an amount of from 0.01% to 10% by weight of the polyisocyanate.

10. A process for the manufacture of isocyanate group-containing isocyanurate compounds as claimed in claim 8 wherein the mono-N-substituted carbamic ester is used in an amount of from 0.1% to 0.5% by weight of the polyisocyanate.

11. A process for the manufacture of isocyanate group-containing isocyanurate compounds as claimed in claim 3 wherein the ester is butyl acetate.

References Cited by the Examiner
UNITED STATES PATENTS

| | | | |
|---|---|---|---|
| 2,954,365 | 9/60 | Windemuth | 260—77.5 |
| 2,978,449 | 4/61 | France | 260—77.5 |

LEON J. BERCOVITZ, *Primary Examiner.*